No. 809,803. PATENTED JAN. 9, 1906.
W. F. HOBBS.
NAIL PULLER.
APPLICATION FILED JUNE 5, 1905.
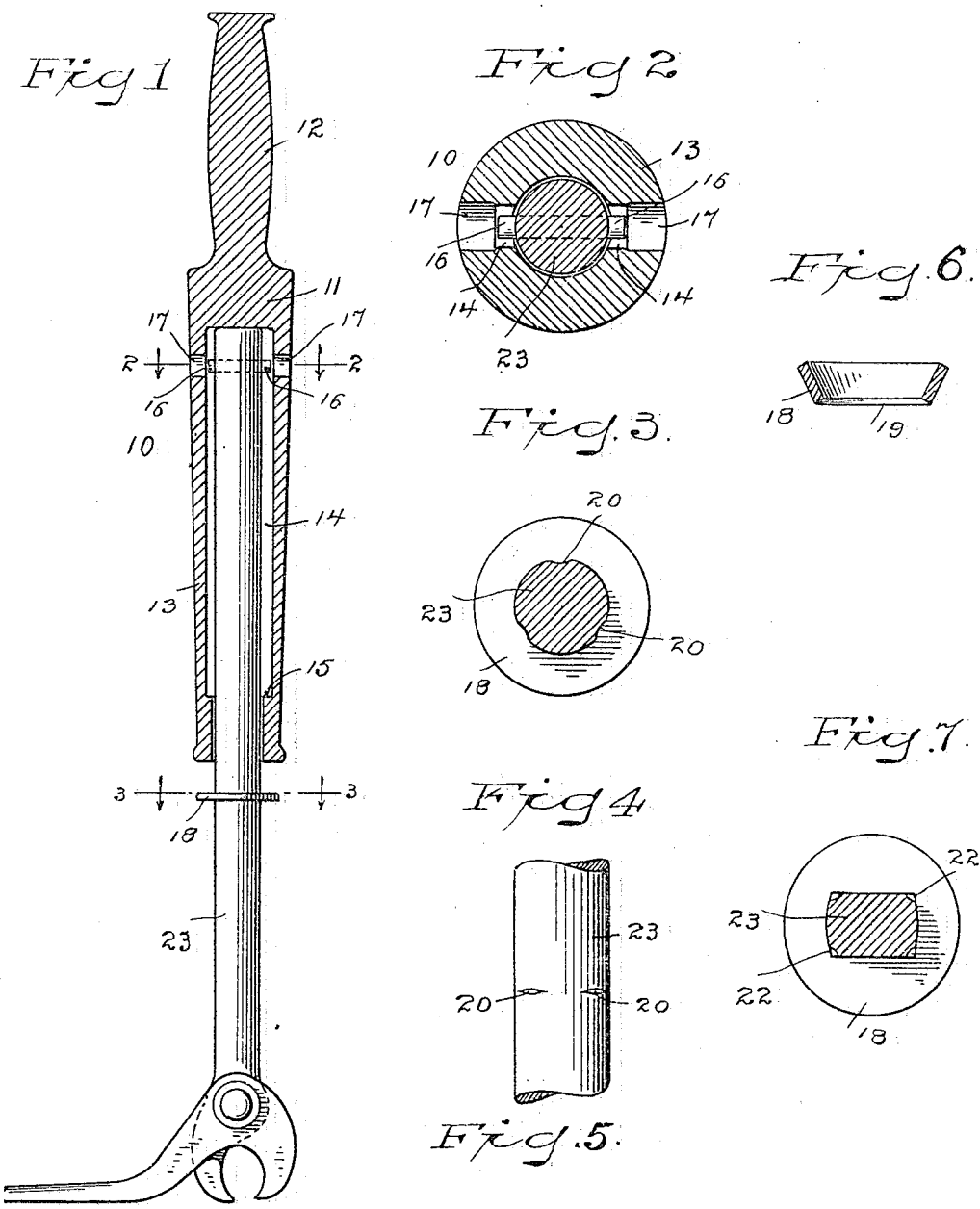
WITNESSES:
H. A. Lamb
S. W. Atherton
INVENTOR
Willie F. Hobbs
BY
A. M. Wooster
ATTORNEY

UNITED STATES PATENT OFFICE.

WILLIS F. HOBBS, OF BRIDGEPORT, CONNECTICUT, ASSIGNOR TO THE BRIDGEPORT HARDWARE MANUFACTURING COMPANY, OF BRIDGEPORT, CONNECTICUT, A CORPORATION OF CONNECTICUT.

NAIL-PULLER.

No. 809,803.　　　Specification of Letters Patent.　　　Patented Jan. 9, 1906.

Application filed June 5, 1905. Serial No. 263,719.

*To all whom it may concern:*

Be it known that I, WILLIS F. HOBBS, a citizen of the United States, residing at Bridgeport, county of Fairfield, State of Connecticut, have invented a new and useful Nail-Puller, of which the following is a specification.

This invention relates to the class of nail-pullers in which a shank carries a fixed jaw and has pivoted thereto a movable jaw provided with a bearing-lever, the upper end of the shank lying within a sliding handle or rammer, which causes the jaws to grip a nail below the head, the nail being extracted by moving the handle downward, using the bearing-lever as a fulcrum.

It is one of the objects of this invention to provide an implement of this class which shall be simple and inexpensive to construct and assemble, so that it may be sold at a reasonable price, able to stand the hardest kind of usage without injury, and which shall be so constructed that the handle and shank will not turn relative to each other and will not become detached in use.

A further object of the invention is to provide an implement of this class so constructed that the hand which grasps the shank in use shall be protected from blows of the handle or rammer.

With these and other objects in view I have devised the novel improvements in nail-pullers of which the following description, in connection with the accompanying drawings, is a specification, reference characters being used to indicate the several parts.

Figure 1 is an elevation of my novel nail-puller complete, the handle being in section; Fig. 2, a section on an enlarged scale on the line 2 2 in Fig. 1 looking down; Fig. 3, a section of the shank on the line 3 3 in Fig. 1, the hand-guard appearing in plan. Figs. 4 and 5 are detail elevations of the shank, showing different ways of scoring the shank to receive the hand-guard; Fig. 6, a section of the hand-guard detached, showing the shape in which it is blanked out from sheet metal ready for attachment to the shank by means of a blow from a drop-hammer; and Fig. 7 is a view corresponding with Fig. 3, but illustrating a variant mode of attaching the hand-guard to the shank, which is shown as made angular in cross-section.

10 denotes the handle as a whole, which comprises a head 11, a suitable handpiece 12, and a barrel 13, which receives the upper end of the shank 23, the blows in use being delivered by the head upon the upper end of the shank. The barrel is provided with opposite internal longitudinal grooves 14, which terminate near the lower end of the barrel in shoulders 15. Near the upper end of the shank is a cross-pin 16, the ends of which slide freely in the grooves, but prevent the shank from turning in the handle, and also by engagement with the shoulders make it impossible for the shank and handle to become detached in use. The upper end of the barrel is provided on opposite sides with holes 17, which permit the cross-pin to be inserted and driven into the shank after the latter has been inserted in the barrel.

18 denotes the hand-guard, which is punched out from sheet metal in the form of a dish-shaped washer having a central opening 19, which just receives the shank, the latter being suitably scored to receive it. This scoring may be a series of circumferential notches 20, as in Fig. 4, or a circumferential groove 21, as in Fig. 5. The hand-guard is attached to the shank by passing the shank through the opening therein until the edge of the opening registers with the scoring and then by means of a suitably-arranged drop-hammer striking a blow upon the hand-guard, which flattens it out at right angles to the axis of the shank and causes the inner edge of the opening in the hand-guard to rigidly engage the scoring in the shank.

A variant mode of attaching the hand-guard to the shank, which may be conveniently employed when the handle is angular in cross-section, is illustrated in Fig. 7. In this mode of attachment the shank is not scored and the attaching-disk is made flat and is provided with a central opening which just receives the shank. The shank, with the hand-guard thereon in proper position, is then indented at the corners just above and below the hand-guard and metal is displaced and forced against the hand-guard, as indicated at 22 in Fig. 7, thereby locking the hand-guard rigidly in place on the shank.

It will be observed that I am able to employ commercial stock for the shank or rod of the puller and without changing its shape in any way rigidly secure the washer, which constitutes the guard, so that it cannot be dislodged. The connection of the guard with the shank is a reasonably-cheap one, and yet is sufficiently strong to prevent any liability of the guard being displaced, so that it might be struck by the lower end of the barrel.

Having thus described my invention, I claim—

In an implement of the character described, the combination with a handle comprising a handpiece and a barrel having internal grooves and shoulders at the lower ends of said grooves and having holes through its sides near the upper end of the barrel, a nail-puller having a shank of substantially uniform diameter, said shank having surface scorings at a distance from its upper end greater than the depth of the space within the barrel and having a cross-pin the ends of which are fitted to slide in the grooves of the barrel, and a guard comprising a metal washer having the edge of its central opening rigidly engaged with said scorings of the shank.

In testimony whereof I affix my signature in presence of two witnesses.

WILLIS F. HOBBS.

Witnesses:
A. M. WOOSTER,
S. W. ATHERTON.